(12) United States Patent
Bannister

(10) Patent No.: US 9,372,494 B2
(45) Date of Patent: Jun. 21, 2016

(54) CURRENT REGULATOR

(75) Inventor: Dave Bannister, Worcester (GB)

(73) Assignee: ACCURIC LTD., Worcestershire (GB)

( * ) Notice: Subject to any disclaimer, the term of this patent is extended or adjusted under 35 U.S.C. 154(b) by 217 days.

(21) Appl. No.: 14/126,988

(22) PCT Filed: Jun. 22, 2012

(86) PCT No.: PCT/GB2012/051448
§ 371 (c)(1),
(2), (4) Date: Dec. 17, 2013

(87) PCT Pub. No.: WO2013/005002
PCT Pub. Date: Jan. 10, 2013

(65) Prior Publication Data
US 2014/0145643 A1    May 29, 2014

(30) Foreign Application Priority Data

Jul. 4, 2011 (GB) .................................. 1111359.4
Jun. 14, 2012 (GB) .................................. 1210561.5

(51) Int. Cl.
| | | |
|---|---|---|
| *G05F 1/00* | (2006.01) | |
| *G05F 3/18* | (2006.01) | |
| *H05B 33/08* | (2006.01) | |
| *G05F 3/16* | (2006.01) | |

(52) U.S. Cl.
CPC .. *G05F 3/18* (2013.01); *G05F 3/16* (2013.01); *H05B 33/0803* (2013.01); *H05B 33/0812* (2013.01); *H05B 33/0854* (2013.01); *Y02B 20/343* (2013.01); *Y02B 20/345* (2013.01)

(58) Field of Classification Search
CPC ............................... G05F 3/18; H05B 33/0803
USPC .................. 315/294, 312; 327/108–112, 103
See application file for complete search history.

(56) References Cited

U.S. PATENT DOCUMENTS

| | | | | |
|---|---|---|---|---|
| 3,530,367 A | * | 9/1970 | Gardenghi | ................ G05F 3/18 323/231 |
| 4,424,413 A | * | 1/1984 | Skobranek | ............. H04L 25/26 178/17 R |
| 2004/0021425 A1 | | 2/2004 | Foust et al. | |
| 2006/0076905 A1 | * | 4/2006 | Inagaki | ............. H05B 33/0812 315/291 |
| 2010/0277091 A1 | | 11/2010 | Brieda et al. | |
| 2012/0032626 A1 | | 2/2012 | Tranchand et al. | |

FOREIGN PATENT DOCUMENTS

| | | |
|---|---|---|
| EP | 2320711 A2 | 5/2011 |
| EP | 2282248 A1 | 9/2011 |
| EP | 2320711 A2 | 11/2011 |

(Continued)

OTHER PUBLICATIONS

Chattopadhyay, "Electronics (Fundamentals and Applications)," New Age International, 2006, pp. 74-75.*

(Continued)

*Primary Examiner* — Lincoln Donovan
*Assistant Examiner* — Thomas Skibinski
(74) *Attorney, Agent, or Firm* — Huffman Law Group, PC

(57) ABSTRACT

The present application describes a current regulator for providing a regulated current from an input voltage. The current regulator comprises a voltage regulator circuit, operable to provide a regulated voltage, which comprises a plurality of Zener diodes connected in parallel.

17 Claims, 6 Drawing Sheets

(56) References Cited

FOREIGN PATENT DOCUMENTS

| | | |
|---|---|---|
| FR | 2450482 | 9/1980 |
| FR | 2450482 A1 | 9/1980 |
| GB | 1052790 | 12/1966 |
| JP | 54-73256 | 6/1979 |
| JP | 62118415 | 5/1987 |
| JP | S62118415 A | 5/1987 |
| JP | 64-23314 | 1/1989 |
| JP | 2008004731 A | 1/2008 |
| JP | 2008-211132 | 11/2008 |
| WO | 2010122513 A1 | 10/2010 |

OTHER PUBLICATIONS

Patents Act 1977: Search Report under Section 17(5), Application No. GB1111359.4 dated Dec. 7, 2011.
Patents Act 1977: Search Report under Section 17(5), Application No. GB1210561.5 dated Sep. 27, 2012.
PCT International Search Report, Application No. PCT/GB2012/051448, dated Sep. 12, 2012.
European Examination Report, Application No. 12738154.9, dated May 9, 2014.
Patents Act 1977: Examination Report Under Section 18(3), Application No. GB1210561.5, dated May 13, 2014.

\* cited by examiner

CURRENT REGULATOR

FIELD OF THE INVENTION

The present invention relates to a current regulation device. In particular, the present invention relates to a current regulator suitable for supplying a drive current to devices such as light emitting diodes (LEDs), and other devices which are sensitive to fluctuations in current.

BACKGROUND

The reduced cost and continued improvement in the performance of LEDs has led to their increased application in recent years. They are widely employed, for example, as illumination elements in backlighting applications, such as within the backlight of liquid crystal displays (LCDs). Backlights of this type are used to provide uniform and constant illumination of an array of LCD elements which make up the display. LEDs are also commonly employed in other applications such as within lighting assemblies, status indicators and displays on a variety of equipment and installations. Within all of these applications, LEDs are typically arranged in series connected strings and are provided with a substantially constant current, via a constant current driver circuit. Such driver circuits therefore include a current regulation means.

It is well known that variations in the drive current supplied to an LED, or a chain of LEDs, forming part of a lighting system can adversely affect the performance of the system. For example, in large lighting or signage applications, uncertainty in the drive current can lead to corresponding uncertainty in power consumption. Such uncertainties are generally unwelcome in the context of a lighting technology marketed on the basis of energy conservation. As well as this, variations in current can, in certain applications requiring, for instance, Red-Green-Blue (RGB) colour mixing, result in variations in the chromatic properties of an illuminated platform, such as a sign. Furthermore, the useful lifetime of an LED, or series-connected chain of LEDs is related to the junction temperature of the/each LED, which is in turn partly related to the current flowing through the/each LED. Therefore, precise control of LED current can result in improvements in the predictability of LED lifetime. It is further known that variations in the current supplied by an LED driver can occur as a result of variations in component properties due to either manufacturing variations, or as a result of variations in temperature. Other performance requirements for LED drivers for lighting systems, relate to the reliability of a driver. Typically, this is expressed through the use of a metric referred to as Mean Time Between Failures (MTBF). For a given electronic assembly, using well-established components, this metric can readily be calculated, provided that the electrical and thermal stresses placed on each component during operation are known. Due to the mix of components typically used in conventional so-called switch-mode LED drivers, which includes switching Metal Oxide Semiconductor Field Effect Transistors (MOSFETs) and Electrolytic Capacitors, both of which are known to have limitations in terms of long-term reliability, corresponding limitations are placed on the MTBF of such drivers. Conversely, drivers using linear means of current regulation, in place of switch-mode means, typically suffer from variations in current, referred to previously.

It is therefore highly desirable that an LED or a chain of LEDs is supplied with a substantially constant drive current. It is particularly desirable that a substantially constant drive current is produced through the use of high MTBF electronic assemblies, which use high-reliability components such as bipolar transistors and which avoid or at least limit the need for Electrolytic Capacitors. In the case of switch-mode LED drivers, wherein the current regulation function is provided by a switching voltage waveform that successively charges and discharges a circuit element such as an inductor, with such discharge taking place through an LED chain, a substantially constant current can be produced within the LED chain. The current delivered to the LED chain by such a switch-mode driver is dependent on a number of factors, including the proportion of time that the switching voltage is in the 'ON' state, during which it is delivering charge to the LED chain (this proportion being referred to as the Duty Cycle of the switching waveform). This switching process, however, leads to the generation of Electro-Magnetic Interference (EMI) waveforms which necessitate the use of EMI filtering structures, which in turn use Electrolytic Capacitors. From the perspective of seeking to maximize the MTBF of a driver, therefore, it can be advantageous to construct a constant current LED driver, based upon a current regulation circuit that does not use any switch-mode elements, so long as current accuracy can be maintained, including the constancy of current over temperature. The present invention is concerned with the general aim of providing a regulated current from an input voltage in order to provide a stable or substantially constant drive current for supply to illumination devices such as LEDs, or other devices which are adversely affected by, or sensitive to, current fluctuations. Preferred embodiments of the present invention seek to achieve this aim preferably without the use of switch-mode circuitry within the current regulator, thereby tending to increase the long-term reliability of the regulator, as well as reducing or eliminating the need for Electrolytic Capacitors in an LED driver based upon the regulator, thereby increasing further, the long-term reliability of the LED driver.

Current regulator devices or circuits which seek to provide a current to an LED or LED chain that is regulated, or substantially constant, with respect to supply voltage are known. So-called "constant current regulators" can be realised in either two-terminal or three-terminal topologies. FIG. 1a illustrates the case of a two-terminal regulator, whilst FIG. 1b shows a three-terminal current regulator.

However, even with the use of a current regulator device, variations in the drive current supplied to an LED chain can still arise for a number of reasons. Manufacturing spreads—i.e. variations in the manufacturing tolerance of current determining circuit elements—is one of the main causes of variations arising in the LED drive/supply current. Variations also arise due to the "temperature coefficient" of the current regulator circuit—in other words the dependence of the regulator performance with respect to ambient or junction temperature.

As will become apparent from the following discussion relating to previously considered constant current regulators, there are a number of drawbacks associated with the prior art.

FIG. 2 shows a schematic for a typical three-terminal current regulator used for the purpose of driving a chain of LEDs (also cited in US2010/0277091—Brieda et al). The minimum 'drop voltage' across a current regulator according to the design shown in FIG. 2 is around 1.3V—this being equal to two Base-Emitter voltage (vbe) drops (across transistors Q1 and Q2). One of these 'vbe drops'—namely the one across the base-emitter junction of Q1—occurs across R1, resulting in a current through R1 of vbe1/R1. Assuming that Q2 is drawing negligible base current, the current through the LEDs is also equal to vbe1/R1, where vbe1 is the base-emitter voltage of transistor Q1. Consequently, due to the inherent temperature dependence of vbe, the temperature-related variation of the LED current, expressed as a fraction of nominal LED current, is given by:

$$TC = (\delta I_{LED}/\delta T)/I_{LED} = (\delta vbe1/\delta T)/vbe1_{nom} \quad \text{equation 1}$$

Wherein, $vbe1_{nom}$ is the nominal value of vbe1 at a standard temperature (300K). In the design of FIG. 2, $vbe1_{nom}$ is around 0.6V and $\delta vbe1/\delta T$ is, to a very good engineering approximation, −2 mV/K. Consequently, the lowest achievable value of the temperature coefficient, TC, for this design is −0.0033 K$^{-1}$ (−0.33% per Kelvin, or −3,300 ppm per Kelvin). The currents shown for this 'standard solution' in Table 1 of Brieda et al indicate a variation of −0.35% per Kelvin. This value of TC would result in the current provided to the LED string varying by −/+9.25% over a temperature range of +/−55 Kelvin.

The solution proposed by Brieda et al suffers from a temperature coefficient TC of −0.0650% per Kelvin (−650 ppm/K). This results in a variation in LED current of −/+3.6% over +/−55 Kelvin. This variation renders the Brieda solution unsuitable for many applications where fluctuations in ambient temperature are expected and where the optical output, in terms of Luminous Flux and/or chromatic indices, of an assembly of LEDs is/are required to remain substantially constant.

In summary, therefore, although the Brieda design offers some advantages in terms of cost-efficiency, this design is capable of delivering minimum values of temperature coefficient, TC, of around 650 ppm/K in magnitude. This magnitude of TC is still significant and leads to variations of around −/+4% in LED current over the specified temperature range of −30 C to +80 C.

Also known in the art is a generalised two-terminal circuit topology capable of providing a substantially constant current, limited by the current and voltage handling capabilities of a Silicon bipolar transistor. This generalised topology is shown in FIG. 3.

Within this topology, a Voltage Regulating Device (VRD) is used to regulate the voltage across a series combination of a base-emitter voltage, vbe, and a current programming resistor, R. If the regulated voltage across the VRD is Vreg, then the current through the resistor R is given by:

$$I_R = (Vreg - vbe)/R \quad \text{equation 2}$$

By allowing two such currents to mutually bias the base-emitter junctions of the two bipolar transistors shown in FIG. 3, the total regulated current through the regulator is given by:

$$I_T = 2 \cdot I_R = 2 \cdot (Vreg - vbe)/R \quad \text{equation 3}$$

The temperature coefficient of this current, defined (as before) as the fractional change in $I_T$ with temperature, is given by:

$$TC = (\delta I_T/\delta T)/I_T = (\delta Vreg/\delta T - \delta vbe/\delta T)/(Vreg - vbe) \quad \text{equation 4}$$

It is known in the art that for a Silicon bipolar transistor, the value of $\delta vbe/\delta T$ is around −2 mV/K and that vbe, being the voltage across a forward-biased Silicon pn junction is around 0.7V.

The thermal behaviour of the regulated current therefore depends upon the nature and thermal behaviour of the VRD. In light of this, a particular design, based on this generalised topology has been disclosed in which the VRD comprises a series combination of a forward biased PN junction diode and a 'bandgap reference' diode. This design is shown in FIG. 4. For this design, the regulation voltage, Vreg is given by:

$$Vreg = Vdiode + Vbg \quad \text{equation 5}$$

It is a property of a bandgap reference diode, that the voltage across it, Vbg (typically 1.23V) is substantially invariant with temperature, whereas, the voltage across a forward-biased PN junction diode, Vdiode, will vary with temperature in the same way as a base-emitter junction (it also being a forward-biased PN junction, carrying substantially the same current as the diode). Therefore, the thermal behaviour of Vreg will be identical to that of vbe, thereby producing a zero temperature coefficient, TC, for the regulator current.

There are, however, limitations placed on the performance and cost of regulators of this design. In particular, a Silicon bandgap reference diode, maintaining a temperature stabilised voltage across it of 1.23V, operates up to a typical maximum current of 20 mA. This places an upper limit on the total regulator current, $I_T$, of 40 mA.

Furthermore, the very low differential impedance of the bandgap diode (typically less than 1Ω) makes it difficult to ensure that devices of this type can be connected in parallel, whilst sharing current between them. FIG. 5 illustrates the problem. It depicts the I/V characteristics of two bandgap diodes, lying (for worst-case illustration) at each end of the manufacturing spread in Vbg—for a typical Silicon bandgap diode, this spread ($Vbg_2 - Vbg_1$) is around 8 mV. It can readily be seen, that if two such diodes are placed in parallel, the diode with the lowest value of Vbg ($Vbg_1$) will take a certain amount of current (shown as $Ibg_1$) before the other diode begins to take any current. Consequently, there will be a range of VRD current, over which no current-sharing takes place and over which therefore, the current handling capabilities of the VRD and therefore of the current regulator as a whole, remains limited by the current-handling capabilities of a single bandgap reference diode.

By inspecting the I/V characteristic of a bandgap diode with a maximum current handling capability of 20 mA (such as the LT1004-1.2) it can be seen, that the voltage across Bandgap Diode 1 in FIG. 5, has a value which is substantially 8 mV higher than its nominal (low current) value, thereby ensuring that Bandgap Diode 2 is turned-on, when the current through Bandgap Diode 1 has reached a value of around 14 mA. This means that Bandgap Diode 1 and Bandgap Diode 2 do not share current, until the current through Bandgap Diode 1 has reached a value that is only a few milliamps short of its maximum rated value. Furthermore, due to the nonlinear nature of the I/V characteristic of a bandgap diode, where the differential impedance (rate of change of voltage with current) is significantly higher at low current than at high current, as the current through Bandgap Diode 1 increases by 6 mA, up to its rated maximum of 20 mA, the current through Bandgap Diode 2 will increase by significantly less than this (around 3 mA).

Consequently, replacing the bandgap diode in each VRD of a circuit according to FIG. 4, with a parallel combination of two such bandgap diodes, allowing for manufacturing variations in Vbg, can be reliably expected to increase the current handling capability of each VRD by only 9 mA, compared with the desired 20 mA. Therefore, the reliably expected increase in the current handling capability of the current regulator as a whole would be only around 18 mA, as opposed to the desired 40 mA. This is effectively a process of diminishing returns in terms of current handling per unit cost. The importance of this is significant, in view of the fact that bandgap reference diodes are not simple diode structures, but fairly complex integrated circuits, containing several circuit elements. A typical 1.23 Volt bandgap reference diode contains around 13 bipolar transistors and 8 resistors, making it a significant contributor to the overall cost of the current regulator.

An alternative approach, in the case of a circuit according to the design of FIG. 4, would be to form parallel combinations of the entire low current VRD (where each such low current VRD is, as shown, a series combination of forward-biased PN junction diode and bandgap reference diode) to form a high current VRD. This, however, would mean replicating both the bandgap diode and the PN junction diode, thereby again, increasing significantly, the cost of the regulator.

As such, the realisation of the general topology shown in FIG. 4 does not offer a cost-effective solution to the challenge of providing a low temperature coefficient current regulator which is programmable over a wide range of constant currents.

SUMMARY

Embodiments of the present invention seek to alleviate the problems and drawbacks associated with the previously considered current regulator devices. Consideration of the LED driver requirements of a range of different applications, leads to the observation that there exists a need for a current regulator device having improved thermal performance together with accurate current setting capabilities and which is preferably operable over a wide range of programmable current values. Furthermore, in view of the price sensitivity of many of these applications, LED drivers aimed at addressing these needs should ideally be cost-effective. In circuit design terms, this means realising solutions that use simple current topologies and simple components. For example, a cost-effective solution would be one that keeps transistor count low. This would have the added benefit of maximizing the MTBF of the current regulator and therefore of an LED driver incorporating it. It is also desirable to provide a current regulator device which exhibits a lower sensitivity to the manufacturing tolerance of current determining circuit elements than previously considered solutions.

According to a first aspect of the present invention there is provided a current regulator for providing a regulated current from an input voltage, the current regulator comprising:
 a driver circuit comprising a resistor and a transistor; and
 a voltage regulator circuit operable to provide a regulated voltage to said driver circuit, wherein said voltage regulator circuit comprises a plurality of Zener diodes connected in parallel.

Preferably, the driver circuit and the voltage regulator circuit form a first current regulator circuit. Preferably, the first current regulator circuit is cross-coupled to a second current regulator circuit. Preferably, in this case, the second current regulator circuit may comprise:
 a second driver circuit comprising a resistor and a transistor; and
 a second voltage regulator circuit operable to provide a regulated voltage to said second driver circuit, wherein said voltage regulator circuit comprises a plurality of Zener diodes connected in parallel.

Alternatively, the driver circuit and the voltage regulator circuit form a first current regulator circuit which is connected to a resistive summing circuit.

According to a second aspect of the present invention there is provided a current regulator for providing a regulated current from an input voltage, the current regulator comprising:
 a first current regulator circuit and a second current regulator circuit, wherein the output of the first current regulator circuit is cross-coupled to said second current regulator circuit, each of the first and second current regulator circuits comprising:
   a driver circuit comprising a resistor and a transistor; and
   a voltage regulator circuit operable to provide a regulated voltage to the respective driver circuit, wherein said voltage regulator circuit comprises a plurality of Zener diodes connected in parallel.

According to embodiments of the second aspect of the present invention the output of the first current regulator circuit is cross-coupled to said second current regulator circuit such that the collector of the transistor of the first current regulator circuit is connected to the positive terminal of the voltage regulator circuit of the second current regulator circuit.

Preferably, the Zener diodes of the/each voltage regulator circuit comprise silicon Zener diodes. The transistors used in a cross-coupled current regulator circuit of this type preferably form a "complimentary pair" wherein one transistor is a Silicon bipolar transistor of the PNP type and the other is a Silicon bipolar transistor of the NPN type.

According to a third aspect of the present invention there is provided a voltage regulator circuit for use in a current regulator circuit comprising a plurality of Zener diodes connected in parallel.

Embodiments of the present invention advantageously exploit the well-defined breakdown voltage of Zener diodes as a means to regulate the voltage applied to the driver circuit of a current regulator device in order to generate a stabilised current for supply to a given load.

The provision of a plurality of Zener diodes which are connected in parallel to form the voltage regulator circuit according to embodiments of the present invention is advantageous in that it readily facilitates the generation of a wide range of regulated current values ($I_T$). Specifically, the current programming range of a current regulator embodying the present invention can advantageously be selected according to the number of Zener diodes used in each voltage regulator circuit, or voltage regulator device (VRD). As such, according to embodiments of the present invention, it is not necessary to parallelise, or replicate, the whole circuit in order to achieve a range of constant current values. Thus, the parts that are replicated according to the present invention (i.e. the Zener diodes) are simple, relatively inexpensive circuit elements. This advantageously provides a very cost-effective solution to the problem of providing a range of regulated current values, thereby allowing embodiments of the present invention to be useful for stabilizing the drive current for a diverse range of applications.

For Silicon Zener diodes with Zener voltages, Vz, of less than around 5.5V, there exists a value of current, Iz,opt, through the Zener diode at which the rate of change of Zener voltage with temperature substantially equals the rate of change of base-emitter voltage, vbe, of a Silicon bipolar transistor (substantially −2 mV/K). Zener diodes with these Zener voltages, however, differ according to both the value of Iz,opt at which this thermal balance condition is met, and the value of Zener impedance, $Z_Z$ at any given current. Preferred embodiments of the present invention make use of the fact that in a cross-coupled circuit, a VRD can be constructed, using low-voltage Zener diodes, which are chosen on the basis of having a current, Iz,opt, at which the rate of change of the Zener voltage with temperature is substantially equal to the rate of change of the base-emitter voltage, vbe, of a Silicon bipolar transistor with temperature.

Furthermore, according to a particularly preferred embodiment, Zener diodes are selected such that the rate of change of Zener voltage with temperature, δVz/δT should exhibit minimal variation with current, for values of Zener current around Iz,opt, thereby facilitating a wide range of programmable currents through a regulator embodying the present invention, over which the temperature dependency of each current within this programmable range is advantageously small.

Thus, according to preferred embodiments of the present invention, the Zener diodes exhibit a low Zener voltage—i.e. less than 5.5V. Preferably, the Zener diodes exhibit a Zener voltage of between 2.0V and 3.0V. It will be appreciated by those skilled in the art that the Zener voltage of a given Zener diode is defined, in accordance with the definition of the nominal Zener voltage, as the voltage across the diode at a defined diode current. A typical Zener diode current at which the Zener voltage is measured is 5 mA.

Preferred embodiments of the present invention make use of the fact that Silicon Zener diodes with low values of Zener voltage tend to have higher values of differential Zener impedance, $Z_Z$ compared with both higher voltage Zeners and bandgap diodes. These higher values of $Z_Z$ advantageously ensure, within limits defined by the manufacturing tolerance in Zener voltage, that such Zener diodes can be connected in parallel and share, approximately evenly, the current through the parallel combination. This beneficially ensures that several regulator current ranges can be chosen, over which the temperature dependency of current is small and has a value of zero within the range. Each said range relates to a given number of Zener diodes per VRD.

Preferably, embodiments of the present invention seek to alleviate the problem that would normally occur as a result of manufacturing variations in the Zener voltage of any given Zener diode, or indeed manufacturing variations in rectifying diodes, such as those used in prior art ref 2, namely corresponding variations in programmed regulator current, $I_T$. This is done by ensuring that the current through a regulator according to the present invention varies in accordance with the average Zener voltage within each parallel Zener diode stack, where variations in this average value will obey a statistical distribution governed by the Central Limit Theorem of statistics, whereby the standard deviation of the mean Zener voltage within each VRD is reduced by a factor of the square root of the number of Zener diodes per VRD, compared with the standard deviation in the Zener voltage of a single Zener diode. This leads to a reduced variation in the mean Zener voltage within a VRD and therefore reduced fractional variations in regulated current, in higher current variants of a current regulator circuit according to the present invention.

As will be discussed in more detail herein, the voltage regulation device (VRD) according to embodiments of the present invention is highly advantageous in that the parallel combination of Zener diodes not only serves to provide a voltage regulation function, but in preferred embodiments it can also serve to compensate for the temperature dependence of the drive transistor in order to achieve a thermal balancing function, over a wide range of currents, comprising a number of sub-ranges, where each sub-range corresponds to a particular number of paralleled Zener diodes per VRD. Current regulator circuits according to the present invention advantageously provide a regulated current for which the temperature dependence of the regulated current is beneficially reduced to a value measured in tens of parts per million per Kelvin. Indeed, according to particularly preferred embodiments of the present invention, the value of the temperature coefficient, TC, is seen to be substantially zero at specific preferred currents across each sub-range.

Furthermore, it will be appreciated that since this performance may be achieved, according to embodiments of the present invention, by means of a circuit containing only bipolar transistors, Zener diodes and resistors, embodiments of the present invention represent a particularly cost-effective current regulator. As such, embodiments of the present invention find particular application in LED lighting, LCD backlights, including those for large public displays, as well as LED displays, architectural lighting and channel lettering applications, without recourse to additional means for correcting for thermal drift in regulator current.

In summary, preferred embodiments of the present invention advantageously provide a cost-effective regulation circuit, with improved thermal performance (i.e. temperature coefficient values which are less than those associated with the previously considered solutions), which is operable over a range of programmable current values, and which is accurately set.

According to a fourth aspect of the present invention there is provided an illumination apparatus comprising one or more LEDs, the illumination apparatus comprising a current regulator according to an embodiment of the first or second aspect.

The illumination apparatus may, for example, comprise a lighting fixture, containing LEDs, together with one or more LED drivers, where each of the said LED drivers contains one or more current regulators.

BRIEF DESCRIPTION OF THE DRAWINGS

For a better understanding of the present invention, and to show how the same may be carried into effect, reference will now be made, byway of example to the accompanying drawings in which.

DETAILED DESCRIPTION

Figure 6:
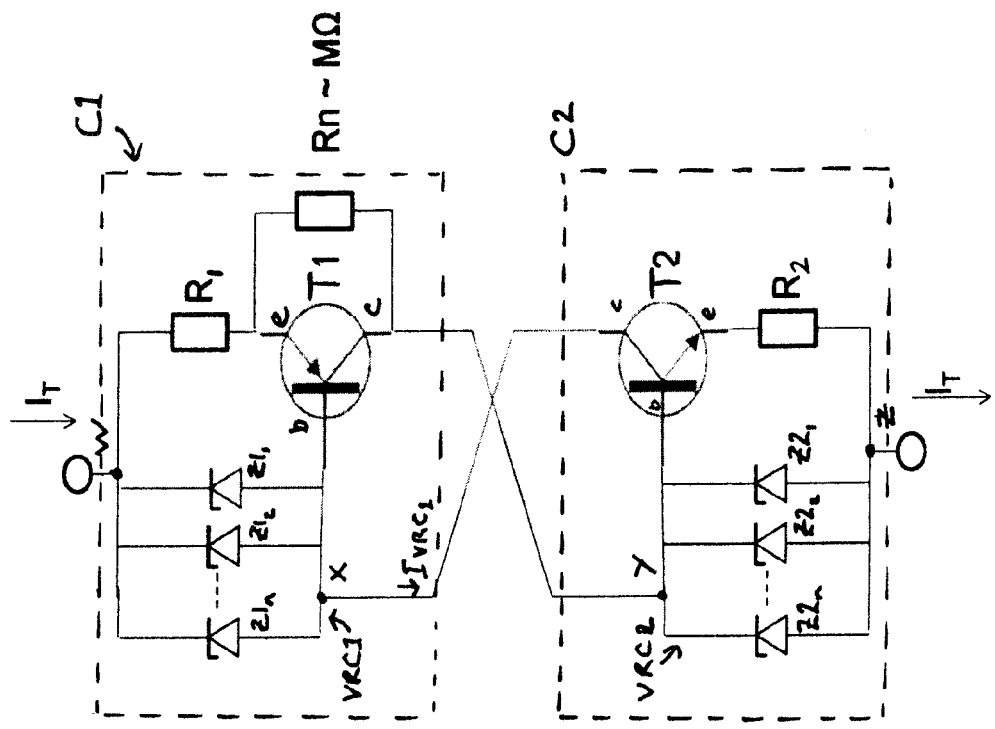
FIG. 6 shows a current regulator circuit according to an embodiment of the present invention.

FIG. 6 shows a two-terminal current regulator circuit according to a first embodiment of the present invention, the current regulator circuit having a first current regulator circuit C1 cross-coupled to a second current regulator circuit C2. The first current regulator circuit C1 comprises a driver circuit having a resistor R1 and a bipolar transistor T1. The first current regulator circuit also comprises a voltage regulator circuit VRC1 comprising a plurality of Zener diodes $Z1_1$, $Z1_2 \ldots Z1_n$ connected in parallel. The second current regulator circuit C2 comprises a driver circuit having a resistor R2 and a bipolar transistor T2. The second current regulator circuit also comprises a voltage regulator circuit VRC2 comprising a plurality of Zener diodes $Z2_1, Z2_2 \ldots Z2_n$ connected in parallel.

A voltage source drives a current IT into node W which connects resistor R1 and the positive terminal of the voltage regulator circuit VRC1 of the first current regulator circuit C1 such that the current IT is divided between the resistor R1 and VRC1. The resistor R1 is connected to the emitter e of transistor T1. The collector current of the bipolar transistor T1, which is determined by the value of R1, the voltage produced by the VRC1 and by the base-emitter voltage Vbe of the transistor T1, is supplied to the positive terminal of the voltage regulator circuit VRC2 of the second current regulator circuit C2 and to the base of transistor T2 at node Y. Node X connects the negative terminal of VRC1, the base of T1 and the collector of T2. Resistor, Rn is simply a source of thermal noise, used to 'kick-start' the circuit.

Assuming negligible base current at T2, $I_{VRD1}$ is equal to the collector current of T2. Furthermore, the collector current of T2 is determined by the value of R2, the voltage produced by the VRC2 and by the base-emitter voltage vbe of transistor T2. The negative terminal of VRC2 is connected to R2 forming the output node Z through which IT flows to the intended load.

By virtue of the cross-coupling of this circuit, the two transistors are advantageously provided with base-biasing currents.

According to the above embodiment, one of the resistors may be held at a constant value, whilst the other is used as a current programming resistor. Alternatively, both of the resistors may be variable in order that they both serve as current programming resistors.

Figure 7:
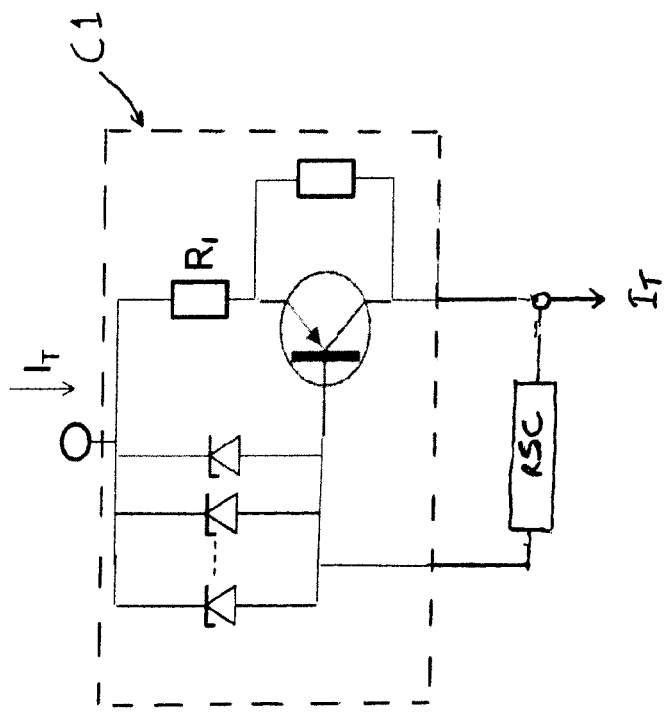
FIG. 7 shows a current regulator circuit according to a second embodiment of the present invention.

According to a second embodiment of the present invention shown in FIG. 7, a current regulator circuit C1 is connected to a resistive summing circuit RSC. The person skilled in the art will appreciate that various designs for the resistive summing circuit are possible. For example, in the particular example shown in FIG. 7, the resistive summing circuit comprises a plurality of resistors connected in parallel.

The following describes the properties and principles of preferred embodiments of the present invention.

Figure 1B:
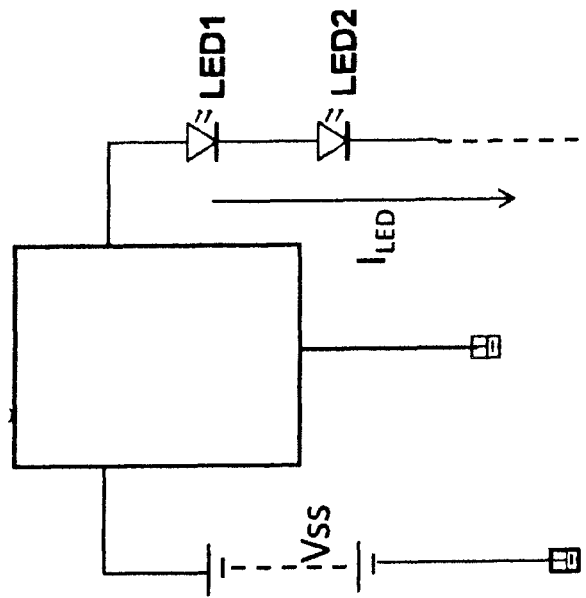
FIG. 1 shows generalized current regulator circuit topologies according to the prior art.
Figure 1A:
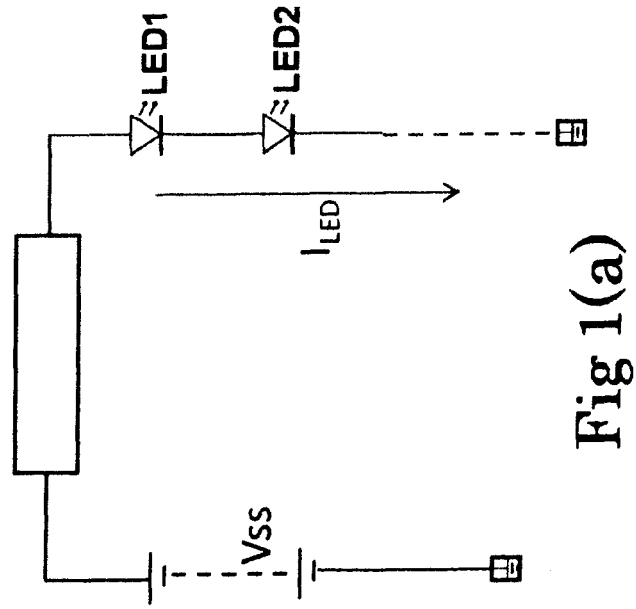
Figure 2:
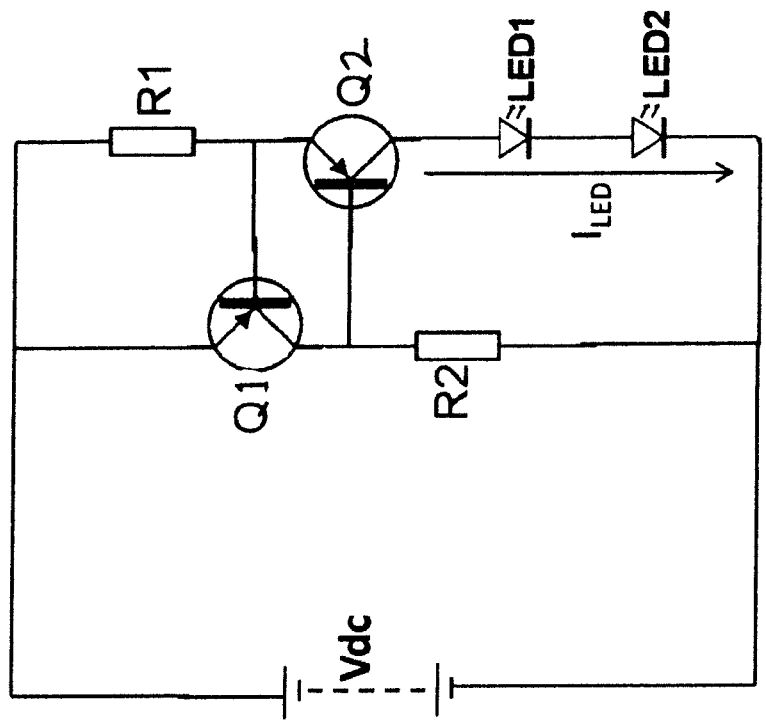
FIG. 2 shows the generalized topology of a three-terminal current regulator circuit according to the prior art.
Figure 3:
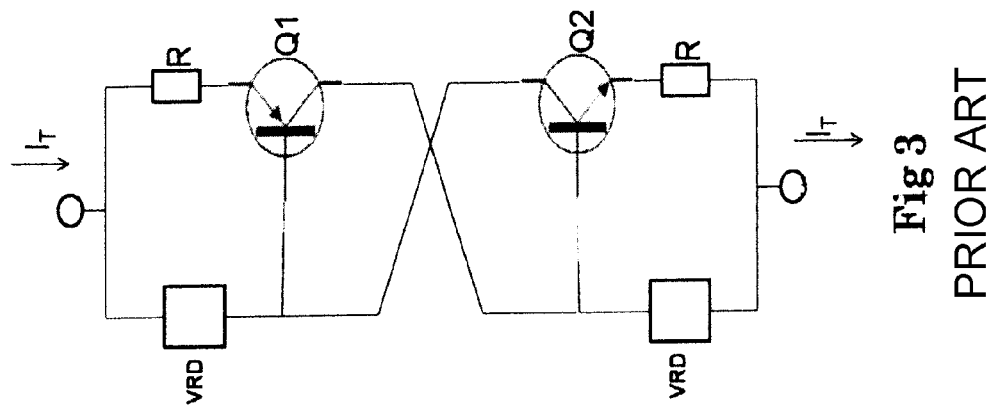
FIG. 3 shows the generalized topology of a two-terminal current regulator circuit according to the prior art.

Setting Accuracy:

The 'setting accuracy' of a current regulator according to embodiments of the present invention is discussed herein, in terms of the variations in the current provided by such a regulator, caused by random variations in the properties of circuit elements. Whilst it should be appreciated by the reader that both random errors and deterministic errors occur in any circuit, it is the random errors that give rise to spreads in circuit performance. Deterministic errors give rise to fixed 'offsets' between designed and realised performance. The setting accuracy of any constant current circuit is properly expressed as the fractional change in regulated current. Thus, for a circuit according to the general topology of FIG. 3:

$$\Delta I_T/I_T = (\Delta Vreg + \Delta vbe)/(Vreg - vbe) \quad \text{equation 6}$$

Wherein, $\Delta Vreg$ is the manufacturing spread in Vreg and $\Delta vbe$ is the manufacturing spread in vbe. In the present invention, the regulating voltage Vreg is provided by low-voltage Zener diodes and therefore, $\Delta Vreg = \Delta Vz$. This spread in Vreg is significantly greater (by a factor of around 10) than the spread in vbe. Therefore:

$$\Delta I_T/I_T \approx \Delta Vz/(Vreg - vbe) \quad \text{equation 7}$$

Typically, for a low voltage (<5.5 Volts) Zener diode, $\Delta Vz$, the statistical spread in Zener voltage is around 10%—equating to a spread of +/−5% in Vz. Eqn 6 indicates that the use of low voltage Zener diodes would, in the absence of any correction means, give rise to a large variation in $I_T$ with manufacturing tolerance in Vz—in other words, a poor current setting accuracy. It therefore becomes desirable, in accordance with embodiments of the present invention, to combine Zener diodes in such a way as to ameliorate this effect.

According to embodiments of the present invention, use is made of a statistical theorem, known as the Central Limit Theorem. One consequence of this theorem is that if a variable, x, is distributed according to a normal distribution, with mean, $\mu$ and standard deviation, $\sigma$, then the mean of samples of size N, will be distributed according to a normal distribution, with the same mean, $\mu$ and a standard deviation of $\sigma/\sqrt{N}$.

Consider the case of a Zener diode, with a nominal Zener voltage, Vz and a manufacturing tolerance, $\Delta Vz$. The value of $\Delta Vz$ will be related to the standard deviation $\sigma$ (Vz) of the wafer-to-wafer statistics of Vz. Typically, the value quoted for the manufacturing spread in Vz will be around +/−3·$\sigma$ (Vz)—the 'six sigma spread'.

If samples of N Zener diodes are taken from this 'global' distribution, to form each parallel diode stack, then the mean value of Zener voltage, <Vz> within each sample will have a mean value, <(<Vz>)> equal to the nominal Zener voltage, Vz and a standard deviation of $\sigma$ (Vz)/$\sqrt{N}$.

According to embodiments of the present invention which use a Voltage Regulation Circuit, VRC, the/each VRC is provided which comprises a parallel stack of Zener diodes, each with the same nominal Zener voltage, Vz.

The regulator, having two diode stacks, carrying currents $Is_1$ and $Is_2$ has a total regulated current, $I_T$ given by:

$$I_T = Is_1 + Is_2 \quad \text{equation 8}$$

Thus $$I_T = [(<Vz_2> - vbe) + (<Vz_1> - vbe)]/R \quad \text{equation 9}$$

The variance in this total current is given by:

$$\text{Var}(I_T) = (\text{Var}(<Vz_2>) + \text{Var}(<Vz_1>))/R^2 \quad \text{equation 10}$$

From the Central Limit Theorem:

$$\text{Var}(<Vz_2>) = \text{Var}(<Vz_1>) = \text{Var}(V_Z)/N \quad \text{equation 11}$$

Therefore:

$$\text{Var}(I_T) = 2 \cdot \text{Var}(Vz)/(N \cdot R^2) \quad \text{equation 12}$$

It can be shown that the nominal regulated current, $I_{Tnom}$, through the regulator is given by:

$$I_{Tnom} = 2 \cdot (Vz - vbe)/R \quad \text{equation (13)}$$

Wherein, Vz takes its nominal value as quoted in the manufacturer's datasheet.

The standard deviation in $I_T$ is given by:

$$\sigma(I_T) = \text{SqrtVar}(I_T) = \text{Sqrt}(2/N \cdot R^2) \cdot \sigma(Vz) \quad \text{equation 14}$$

The 'Setting Accuracy' of $I_T$ is given by the spread in $I_T$ ($\Delta I_T$) as a fraction of $I_{Tnom}$, where the spread is 6. $\sigma$ ($I_T$). Similarly, the manufacturing spread in Vz ($\Delta Vz$) is equal to 6·$\sigma$ (Vz).

Therefore:

$$\Delta(I_T) = \text{Sqrt}(2/NR^2) \cdot \Delta(Vz) \quad \text{equation 15}$$

$$\Delta(I_T)/I_{Tnom} = \text{Sqrt}(2/NR^2) \cdot \Delta(Vz) I_{T,nom} \quad \text{equation 16}$$

$$\Delta(I_T)/I_{Tnom} = \Delta(Vz)/[\text{Sqrt}(2 \cdot N) \cdot (Vz - vbe)] \quad \text{equation 17}$$

Wherein, N is the number of Zener diodes in each stack. Therefore, this fractional error in regulator current, for a regulator according to the present invention reduces with the number of Zener diodes per stack, by a factor Sqrt(2·N).

Temperature Coefficient and Current Programming Range:

The temperature coefficient of current for a regulator embodying the present invention is given by:

$$TC = (\delta Vz/\delta T - \delta vbe/\delta T)/(Vz - vbe) \quad \text{equation 18}$$

This temperature coefficient is substantially zero when the current through each Zener diode is equal to Iz,opt (the value of Zener current at which δVz/δT=δvbe/δT). Consequently, there are values of regulator current, $I_T$, at which TC is substantially zero. For optimal thermal performance, therefore, these values of $I_T$ become 'preferred' operational currents for a regulator embodying the present invention.

As the Zener current, Iz, departs from this optimal value, the value of TC changes. Preferred embodiments of the present invention seek to provide a current programming range over which TC deviates from zero by only a small amount. For illustrative purposes, we shall take this current programming range as being that over which the value of TC is bounded within the range +/−75 ppm per Kelvin. Therefore, in defining upper and lower bounded values of temperature coefficient, TC, as $TC_U=7.5 \times 10^{-5}$ per K and $TC_L=-7.5 \times 10^{-5}$ per K, the upper and lower values of δVz/δT corresponding to the two ends of the current programming range are:

$$(\delta Vz/\delta T)_L = TC_L \cdot (Vz_U - vbe) + \delta vbe/\delta T \qquad \text{equation 19}$$

and $$(\delta Vz/\delta T)_U = TC_U \cdot (Vz_L - vbe) + \delta vbe/\delta T \qquad \text{equation 20}$$

$TC_U$ is the upper bound value of TC, which corresponds to the lower bound of Zener current; $TC_L$ is the lower bound of TC, which corresponds to the upper bound of Zener current. $Vz_U$ and $Vz_L$, denote the values of Zener voltage at the upper and lower limits of Zener current respectively. These values of Vz can be accurately approximated by assuming, a-priori, that the range of current through the mean Zener diode within each stack is around 10 mA to 20 mA. This range of currents is centered on a value of Zener current that corresponds to the value of Iz,opt for a 2.4V Zener diode, chosen for reasons given later. Then the accurate values of $I_Z$ ($I_{Z,U}$ and $I_{Z,L}$) corresponding to the lower and upper values of δVz/δT respectively, can usually be obtained from the Zener diode manufacturer's datasheet. The corresponding values of $I_T$ are then:

$$I_{T,U} = 2 \cdot N \cdot I_{Z,U} \text{ and } I_{T,L} 2 \cdot N \cdot I_{Z,L} \qquad \text{equation 21}$$

Assuming the bipolar transistors have high values of β(Ic/Ib) the total current through the regulator at the centre of its programming range, for a given value of N is given by:

$$I_{T,cen} = 2 \cdot N \cdot Iz, opt \qquad \text{equation 22}$$

From equation 9, the value of the programming resistor corresponding to this central value of current is given by:

$$R = 2 \cdot (<Vz> - vbe)/I_{T,cen} \qquad \text{equation 23}$$

Where the <Vz> takes the value of the nominal Zener voltage at Iz,opt. For values of total regulator current elsewhere within the programming range:

$$R = 2 \cdot (<Vz> - vbe)/I_T \qquad \text{equation 24}$$

Figure 4:
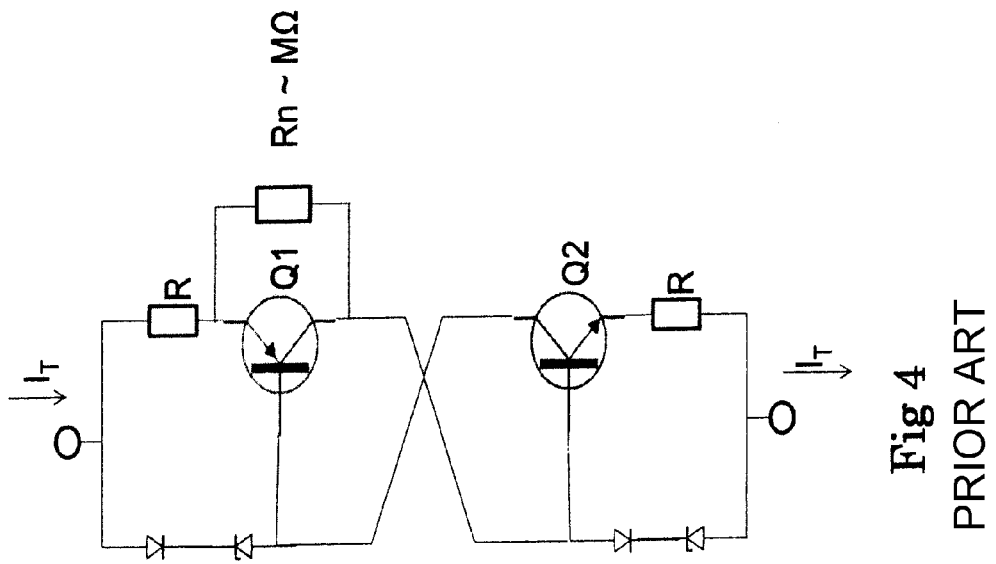
FIG. 4 shows a current regulator circuit design according to the prior art.
Figure 5:
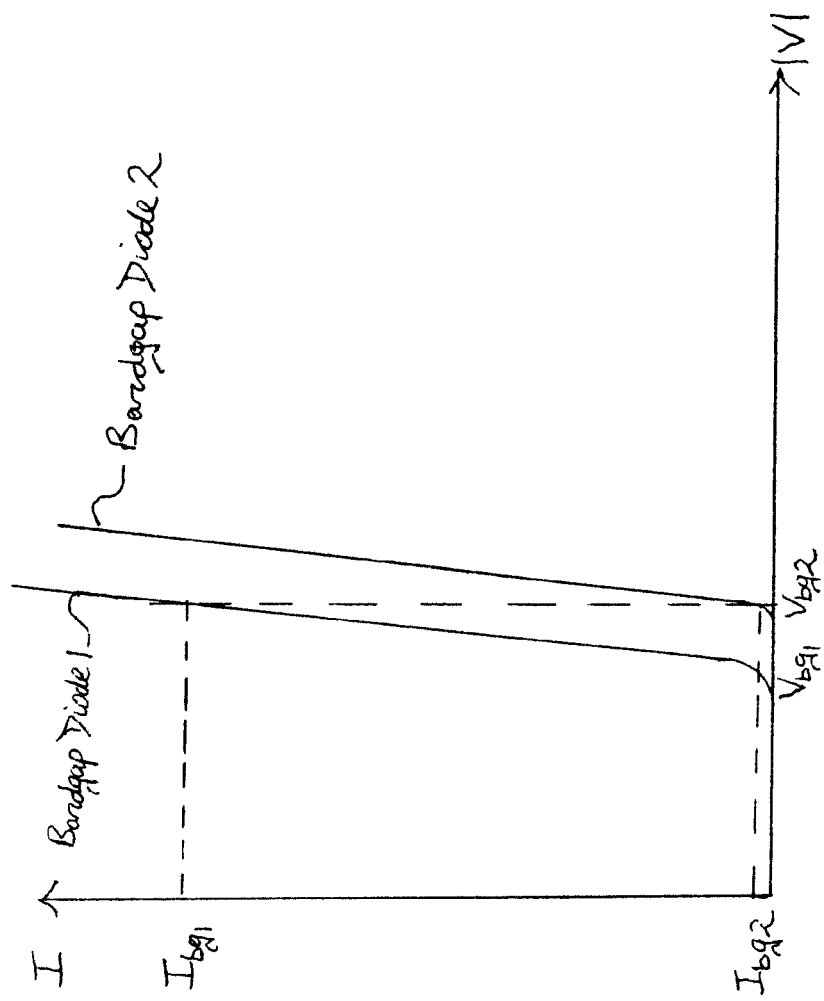
FIG. 5 depicts a graphical representation of the current/voltage (I/V) characteristics of two bandgap diodes.

Current Sharing:

It is known in the art that difficulties arise in connecting Zener diodes in parallel. These difficulties relate to the extent to which Zener diodes share current—similar to the case of bandgap reference diodes used in the prior art depicted in FIG. 4. If the differential Zener impedance (rate of change of Zener voltage, Vz, with current) at around the operating current per Zener diode (Iz,opt) is insufficiently high, or if the manufacturing spread in Vz (ΔVz) is too high, then the Zener diode with the lowest Zener voltage in the stack will take all (or at least most) of the current. To counter this problem, thereby ensuring that all the Zeners in each stack get turned on, it is preferable to use Zener diodes with a small manufacturing spread in Zener voltage and a nominal Zener voltage for which the Zener impedance at Iz,opt is greater than a few Ohms. Thus, according to preferred embodiments, a small variation exists between the Zener voltages of the Zener diodes. The differential Zener impedance is normally regarded as a 'parasitic' or unwanted impedance. However, in the context of the present invention this usefully facilitates current sharing.

Figure 8:
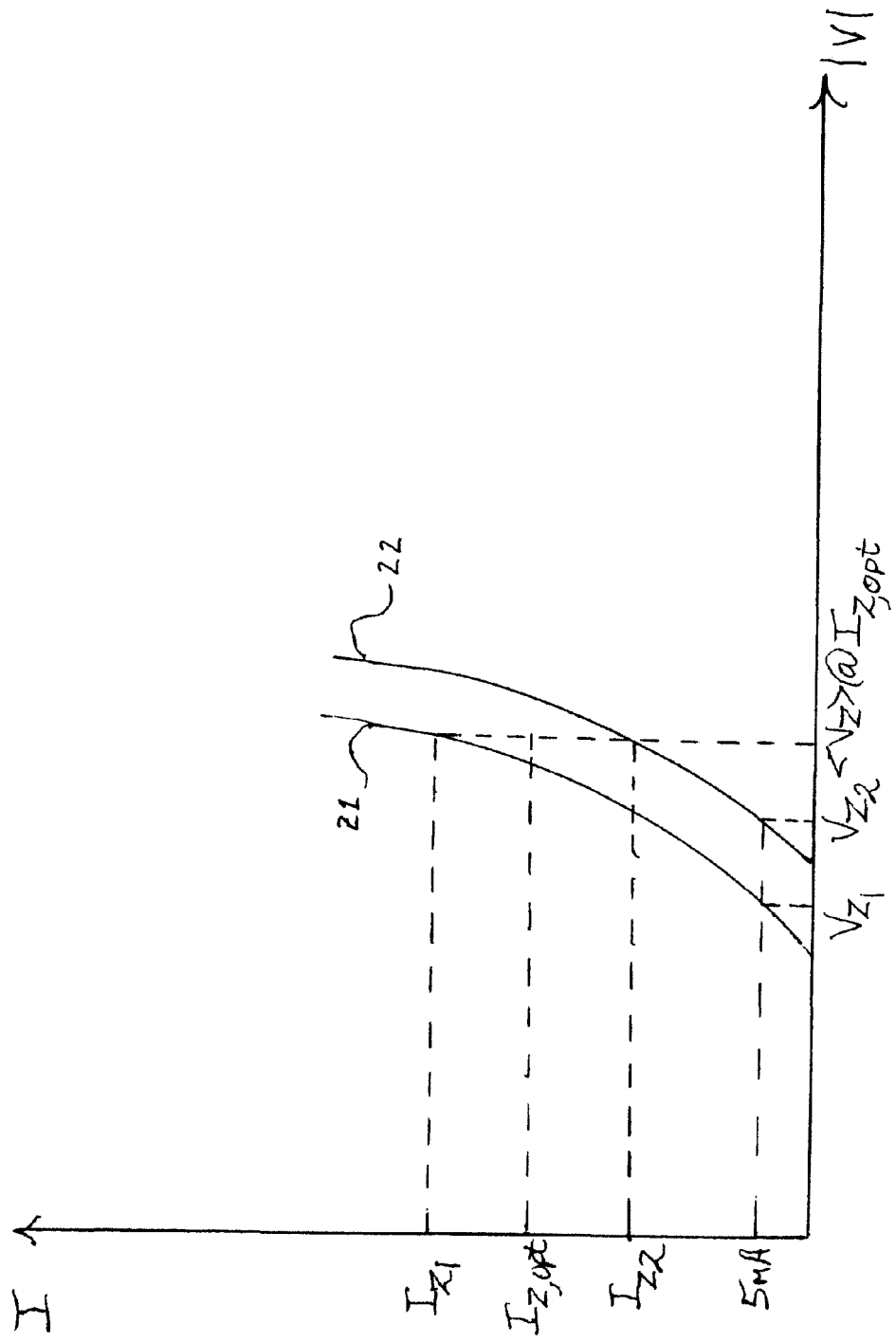
FIG. 8 depicts a graphical representation of the current/voltage (I/V) characteristics of two Zener diodes.

This is shown by reference to FIG. 8, which depicts the I/V characteristics of two Zener diodes, Z1 and Z2, with Zener voltages lying at the extremities of the manufacturing tolerance range for a given nominal Zener voltage. The Zener voltage of each Zener diode is defined, in accordance with the definition of the nominal Zener voltage, as the voltage across the diode at a defined diode current, of normally 5 mA. Furthermore, in view of the design of the regulator using such Zener diodes, whereby the nominal Zener current is Iz,opt, the currents through Zener 1 and Zener 2 in FIG. 6, lie either side of this value. Therefore, by construction, the relationship between ($Iz_1 - Iz_2$) and ($Vz_2 - Vz_1$) is given by:

$$(Iz_1 - Iz_2) = (Vz_2 - Vz_1)/R_z \qquad \text{equation 24}$$

Wherein, $R_Z$ is the Zener resistance (the real part of the Zener impedance, $Z_Z$) at Iz,opt. For a typical 2.4 Volt Silicon Zener diode (cited for reasons given later) $R_Z$ is around 35Ω and Iz,opt is substantially 14.5 mA. The manufacturing spread in Vz ($Vz_2 - Vz_1$) is typically 0.24V. Therefore, the worst-case difference in the currents through Zener 1 and Zener 2 is around 7 mA. This means that Zener 1 carries a current of Iz,opt plus 3.5 mA ($Iz_1 = 18$ mA) whilst Zener 2 carries a current of Iz,opt minus 3.5 mA ($Iz_2 = 11$ mA). By inspection of the thermal behaviour of a typical 2.4 Volt Silicon Zener diode, the typical rates of change of $Vz_1$ and $Vz_2$ with temperature are (at 18 mA and 11 mA respectively) substantially −2.1 mV/K and −1.9 mV/K. Therefore, the average rate of change of Zener voltage with temperature is substantially −2.0 mV/K, as desired for optimal thermal behaviour (δVz/δT=δvbe/δT) at a nominal current per Zener diode of Iz,opt.

Therefore, in contrast to a circuit using combinations of forward-based PN junction diodes and bandgap reference diodes, a circuit embodying the present invention advantageously uses current-sharing voltage references (low voltage Zener diodes) within each VRD. In view of the fact that, in contrast to bandgap reference diodes, such low-voltage Zener diodes are simple PN junction structures, this provides a cost-effective means by which the current handling capabilities and therefore, the current programming range of a current regulator can be selected, according to the number of such low-voltage Zener diodes used in each VRD.

The utility of this approach is shown by reference to a series of different embodiments, each differing in terms of the number of Zener diodes per VRD.

The preferred selection criteria for Zener diodes used in a preferred embodiment of the present invention are, in light of the preceding:

1. ΔVz (manufacturing spread in Vz—i.e. the variations arising between the Zener voltages of the plurality of Zener diodes comprised in a given VRD) should be low. This advantageously ensures good setting accuracy and facilitates current sharing.
2. The Zener impedance $Z_Z$ should be high at operating current per diode, Iz,opt in order to advantageously enable current sharing.
3. Vz at Iz,opt should be low in order to achieve a low 'drop-out voltage', which is equal to 2×Vz.

4. The rate of change of δVz/δT with current (δVz/δT·δIz) should be low, for currents around Iz,opt in order to advantageously achieve a wide programmable current range.
5. The value of Iz,opt should be low for cases where the setting accuracy of programmed current is particularly important, as this forces N to be high for any given value of regulator current Inspection of thermal performance data for several commercially available Silicon Zener diodes shows that the first four of these criteria are substantially met by choosing a Zener diode with a low Zener voltage or, preferably the lowest available Zener voltage—typically, 2.4V at the Zener voltage reference current, 5 mA. For applications in which setting accuracy of programmed current is particularly important, a slightly higher Zener voltage (substantially 3.0V at 5 mA) can be chosen, as this is consistent with a lower value of Iz,opt, consistent with preferred selection criterion 5.

Example Embodiments

For a typical 2.4V Silicon Zener diode, where the Zener voltage is measured at a Zener current of 5 mA, the Zener voltage at Iz,opt (which is substantially 14.5 mA) is 2.9V. Also, for a typical NPN or PNP Silicon transistor, carrying an appreciable emitter current, vbe≈0.7V.

$\Delta Vz = 0.24$ V
$Iz,opt = 14.5$ mA
$Z_Z$ @ $Iz,opt = 35\Omega$
$Vz$ @ $Iz,opt = 2.9$ V
$Vz$ @ 10 mA (value taken for $Vz_L$) = 2.75 V
$Vz$ @ 20 mA (value taken for $Vz_U$) = 3.1 V
$(\delta Vz/\delta T)_U = -1.85$ mV/K
$(\delta Vz/\delta T)_L = -2.18$ mV/K
$I_{Z,L} = 9.5$ mA, $I_{Z,U} = 23.5$ mA Performance metrics can be calculated from these figures, assuming the resistors (R) have zero temperature coefficient. In practice, ultra-low temperature coefficient resistors represent a significant uplift in cost. Affordable thick-film chip resistors, however, are currently available, with temperature coefficients of +/−25 ppm/K across the resistance range required and with resistance accuracies of +/−0.1%. The performance metrics for a range of N from 1 to 6 are given in Table 1.

TABLE 1

| N | Centre Current $I_{T,cen}$ (mA) (at which, TC = 0) | R @ $I_{T,cen}$ (Ω) | Setting Accuracy of current @ $I_{T,cen}$ | Programmable Current Range, over which −75 ppm/K < TC < +75 ppm/K | |
|---|---|---|---|---|---|
| | | | | $I_{T,L}$ (mA) | $I_{T,U}$ (mA) |
| 1 | 29  | 151.7 | +/−5.5% | 19  | 47  |
| 2 | 58  | 75.86 | +/−3.9% | 38  | 94  |
| 3 | 87  | 50.57 | +/−3.2% | 57  | 141 |
| 4 | 116 | 37.93 | +/−2.7% | 78  | 188 |
| 5 | 145 | 30.34 | +/−2.4% | 97  | 235 |
| 6 | 174 | 25.29 | +/−2.2% | 116 | 282 |

This shows that embodiments of the present invention advantageously provide a topology for a current regulator, based on which, regulators can be designed which provide a range of programmed currents from around 20 mA to around 280 mA, over which a temperature coefficient of current, lying between −75 ppm per Kelvin and +75 ppm per Kelvin (−0.0075% per Kelvin and +0.0075% per Kelvin) is maintained. Each embodiment of the present invention comprises two bipolar Silicon transistors and a number of low-voltage Silicon Zener diodes, beneficially providing a low-cost solution.

Manufacturing variations in the value of Iz,opt would be sensibly accommodated by specifying a product designed according to a particular embodiment of the present invention, over a narrower programmed current range. A realistic range of currents over which the +/−75 ppm per Kelvin temperature coefficient can be specified would be around 25 mA to 220 mA. In circumstances where low drop-out voltage and therefore low Zener voltage, is less important than setting accuracy, it would be advantageous to use Zener diodes having a slightly higher Zener voltage, consistent with the need to maintain high Zener impedance. Such slightly higher voltage (e.g. 3.0V) Zener diodes have lower values of Iz,opt. This means that for any given regulator current, a higher number of Zeners would be required in each stack, leading, in view of the Central Limit Theorem, to a greater setting accuracy for that regulator current. In circumstances where the value of TC is required to be substantially zero at a specific current, $I_{spec}$, or over a small range of programmed currents centred on $I_{spec}$, it is possible to choose a value of Zener voltage for which Silicon Zener diodes have a value of Iz,opt given by:

$$Iz,opt = I_{spec}/2 \cdot N \qquad \text{equation 25}$$

Where N is an integer and corresponds to the number of Zener diodes per VRD in such a regulator circuit.

For example, it can be shown that for Vz=2.7 V, the corresponding value of Iz,opt for a Silicon Zener diode is typically 5 mA. Therefore, it is possible to construct a current regulator circuit, embodying the present invention, which uses two such Zener diodes per VRD and which has a temperature coefficient of current, TC, which is substantially equal to zero for a total regulator current, $I_T$, of 20 mA.

Furthermore, in order to facilitate ease of current programming, a regulator embodying the present invention could be used, where one of the programming resistors is held constant (at the centre current value, for a given N) whilst the other is used as the programming resistor.

The invention claimed is:

1. A current regulator for providing a regulated current from an input voltage comprising:
a driver circuit comprising a resistor and a transistor; and
a voltage regulator circuit operable to provide a regulated voltage to said driver circuit, wherein said voltage regulator circuit comprises a plurality of Zener diodes connected in parallel, each Zener diode having a Zener voltage of less than 5.5V and wherein a variation of between 0.1V and 0.3V exists between the Zener voltages of the Zener diodes comprised in the plurality of Zener diodes.

2. A current regulator as claimed in claim 1, wherein said driver circuit and said voltage regulator circuit form a first current regulator circuit, and wherein said first current regulator circuit is cross-coupled to a second current regulator circuit.

3. A current regulator as claimed in claim 2, wherein said second current regulator circuit comprises:
a second driver circuit comprising a resistor and a transistor; and
a second voltage regulator circuit operable to provide a stabilized reference voltage to said second driver circuit, wherein said second voltage regulator circuit comprises a plurality of Zener diodes connected in parallel, each Zener diode having a Zener voltage of less than 5.5V and wherein a variation of between 0.1V and 0.3V exists between the Zener voltages of the Zener diodes comprised in the plurality of Zener diodes.

4. A current regulator as claimed in claim 1, wherein said driver circuit and said voltage regulator circuit form a first current regulator circuit, and wherein said first current regulator circuit is connected to a resistive summing circuit.

5. A current regulator as claimed in claim 1, wherein the current regulator comprises a two-terminal circuit.

6. A current regulator as claimed in claim 1, wherein the Zener diodes of the voltage regulator circuit comprise silicon Zener diodes.

7. A current regulator as claimed in claim 1, wherein the Zener voltages of the Zenor diodes of the voltage regulator circuit are between 2.0V and 3.0V.

8. A current regulator as claimed in claim 1, operable for providing a programmed regulated current of between 25 mA to 220 mA.

9. A current regulator as claimed in claim 1, wherein the Zener voltage of the Zener diodes comprised in the voltage regulator circuit of the current regulator circuit are selected such that:

$$I_{z,opt} = I_{spec}/2 \cdot N$$

where Iz,opt is the current at which the rate of change of the Zener voltage with temperature substantially equals the rate of change of the base-emitter voltage vbe of the transistor of the current regulator circuit, N is an integer number of Zener diodes per voltage regulator circuit and $I_{spec}$ is a current regulator current at a temperature coefficient of substantially zero.

10. A current regulator as claimed in claim 1, wherein the transistor of the driver circuit comprises a silicon bipolar transistor.

11. A current regulator as claimed in claim 10, wherein the silicon bipolar transistor is of the NPN or PNP type.

12. An illumination apparatus comprising one or more LEDs and a current regulator as claimed in claim 1.

13. A current regulator as claimed in claim 1,
wherein said driver circuit and said voltage regulator circuit form a first current regulator circuit, and wherein said first current regulator circuit is cross-coupled to a second current regulator circuit;
wherein said second current regulator circuit comprises:
a second driver circuit comprising a resistor and a transistor; and
a second voltage regulator circuit operable to provide a stabilized reference voltage to said second driver circuit, wherein said second voltage regulator circuit comprises a plurality of Zener diodes connected in parallel, each Zener diode having a Zener voltage of less than 5.5V and wherein a variation of between 0.1V and 0.3V exists between the Zener voltages of the Zener diodes comprised in the plurality of Zener diodes; and
wherein the transistor of the first or second current regulator circuit is a silicon bipolar transistor of the PNP type whilst the transistor of the other of the first or second current regulator circuit is a silicon bipolar transistor of the NPN type such that the transistors form a complimentary pair.

14. A current regulator for providing a regulated current from an input voltage comprising:
a first current regulator circuit and a second current regulator circuit, wherein the output of the first current regulator circuit is cross-coupled to said second current regulator circuit, each of the first and second current regulator circuits comprising:
a driver circuit comprising a resistor and a transistor;
a voltage regulator circuit operable to provide a regulated voltage to the respective driver circuit, wherein said voltage regulator circuit comprises a plurality of Zener diodes connected in parallel, each Zener diode having a Zener voltage of less than 5.5V and wherein a variation of between 0.1V and 0.3V exists between the Zener voltages of the Zener diodes comprised in the plurality of Zener diodes.

15. A current regulator as claimed in claim 14, wherein the resistor of the first driver circuit and/or the resistor of the second driver circuit is operable to vary in order to serve as a current programming resistor.

16. A current regulator as claimed in claim 14, wherein the transistor of the first or second current regulator circuit is a silicon bipolar transistor of the PNP type whilst the transistor of the other of the first or second current regulator circuit is a silicon bipolar transistor of the NPN type such that the transistors form a complimentary pair.

17. A voltage regulator circuit for use in a current regulator circuit comprising a plurality of Zener diodes connected in parallel, each Zener diode having a Zener voltage of less than 5.5V and wherein a variation of between 0.1V and 0.3V exists between the Zener voltages of the Zener diodes comprised in the plurality of Zener diodes.

* * * * *